United States Patent [19]

Findlay, deceased et al.

[11] Patent Number: 4,929,454

[45] Date of Patent: May 29, 1990

[54] WOOD TREATMENT COMPOSITION

[75] Inventors: David M. Findlay, deceased, late of Terrasse Vaudreuil, by Jean Findlay, executrix; Neil G. Richardson, St-Laurent, both of Canada

[73] Assignee: Domtar Inc., Montreal, Canada

[21] Appl. No.: 788,881

[22] Filed: Oct. 18, 1985

Related U.S. Application Data

[63] Continuation-in-part of Ser. No. 231,588, Feb. 5, 1981, abandoned.

[51] Int. Cl.[5] .................... A01N 59/20

[52] U.S. Cl. .................... 424/638; 424/630

[58] Field of Search .................... 424/140, 141, 145

[56] References Cited

U.S. PATENT DOCUMENTS

| | | | |
|---|---|---|---|
| 959,505 | 5/1910 | Gerlach | 424/140 |
| 3,007,844 | 11/1961 | Schulz | 424/145 |
| 4,038,086 | 7/1977 | Clarke et al. | 424/145 X |
| 4,098,602 | 7/1978 | Seymour et al. | 71/67 |

OTHER PUBLICATIONS

Butcher et al, New Zealand Journal of Forest Science, 9(3):348–58 (1979).

*Primary Examiner*—Leonard Schenkman

*Attorney, Agent, or Firm*—Antoine H. Gauvin

[57] ABSTRACT

The present invention relates to a method of preserving wood material and rendering said wood material resistant to biological deterioration, by impregnating a wood material with a composition comprising an aqueous ammoniacal solution of copper and quaternary ammonium compounds. The invention also embraces the product resulting therefrom.

11 Claims, No Drawings

WOOD TREATMENT COMPOSITION

FIELD OF INVENTION

This is a continuation-in-part of application Ser. No. 231,588 filed Feb. 5, 1981, now abandoned.

The present invention relates to a method of preserving wood material and to the resulting product. More particularly it relates to a method of treating a wood material with an aqueous ammoniacal wood-treating composition containing copper, and/or zinc, and quaternary ammonium compounds.

BACKGROUND OF THE INVENTION/PRIOR ART

In the treatment of wood material to render it resistant to biological attack, it is common practice to treat it with a fluid-borne treating chemical. The treatment of wood material usually comprises soaking or impregnating the wood material with the fluid-borne treating chemical. The second of these techniques which is perhaps the most widely used one is practised in a number of variants, e.g. the full cell process, where the pores of the wood material are partially evacuated before impregnation in order to increase the fluid retained therein; or the empty cell process which is similar to the full cell process except that the preliminary step of evacuation is omitted.

One of the more widely used impregnating compositions is an acidic solution of chromium, copper and arsenic (CCA). Another aqueous composition commonly used in the impregnation of wood material, comprises an ammoniacal solution of water-insoluble treating chemicals such as salts comprising copper and arsenic. While these compositions are generally satisfactory, they both contain arsenic.

Prior to applicant's filing of the application, the inventor was investigating means to obtain a wood preservative system free of arsenic but substantially as effective as those containing arsenic. J. A. Butcher disclosed in the New Zealand Journal of Forestry Science, Vol. 9, p. 348, 1979, systems containing quaternary ammonium compounds and copper. He summarized his findings by pointing out two major problems, one of these being that the copper salts caused very serious corrosion problems. At that time, those working on quaternary ammonium compounds were working on systems which were either neutral or acid.

The reasons for using acidic or neutral systems were based upon the fact that penetration of quaternary ammonium compounds into wood in the presence of $Na_2CO_3$ had been demonstrated to be hindered: In the New Zealand Journal of Forestry Science, Vol. 8, No. 3, p. 403 (1978), Butcher and Drysdale stated in an article entitled "Efficacty of Acidic and Alkaline Solutions of Alkylammonium Compounds as Wood Preservatives" that the question, according to them was one of pH, in that treatment with acidic solutions resulted in even distribution of alkylammonium compounds throughout the wood, such as is required for effective wood preservation, whereas treatment with alkaline solutions resulted in primarily adsorption in the surface layers. The failure of alkaline solutions of alkylammonium compounds to adequately protect the interion zones of wood is also discussed in Butcher, Preston, Hedley and Cross, New Zealand Forest Service Reprint, No. 1111, p. 6, 1977.

Furthermore, in Forest Products Journal, Vol 29, No. 11, p. 26 (1979), Hulme and Thomas specifically used $Na_2CO_3$ to enhance surface soprtion of quaternary ammonium compounds used in anti-sapstain treatments where, in contrast to wood preservation application, such surface localization is desirable. This, again, points away from the use of alkaline systems for wood preservation with quaternary ammonium compounds.

Contrary to the technology of record and the direction indicated thereby, applicant has found that an ammoniacal formulation comprising copper and/or zinc and a quaternary ammonium compound is an effective wood preservative with none of the corrosion problems associated with acidic or neutral metal-containing systems of this type.

It is an object of this invention to provide a method for effectively treating wood in order to obtain a wood product having low mammalian toxicity.

BRIEF DESCRIPTION OF THE INVENTION

The present invention is directed at a method of preserving wood material and rendering said wood material resistant to biological deterioration by impregnating, and preferably using the full cell process, a wood substrate with a wood preservative solution comprising an aqueous ammoniacal solvent having a wood treating composition dissolved therein, wherein the composition contains a quaternary ammonium compound and at least one of copper and zinc, where the quaternary ammonium compound can be represented by the general formula $$(R_1R_2R_3R_4N^+)X^-,$$

where $R_1$ and $R_2$ are independently chosen from the group consisting of alkyl groups having 1 to 3 carbon atoms, $R_3$ is chosen from the group consisting of alkyl groups having 8 to 20 carbon atoms, and $R_4$ is chosen from the group consisting of alkyl groups having 8 to 20 carbon atoms, aryl groups and aryl substituted alkyl groups where the alkyl groups have 1–3 carbon atoms, and $X^-$ is chosen so as to render the quaternary ammonium compound soluble in the ammoniacal solvent where said quaternary ammonium compound and said metallic cation are present in said formulation in biocidally effective amounts, and where the ratio of said quaternary ammonium compound to said metallic cation ranges from about 0.003 to about 30.

DETAILED DESCRIPTION OF THE INVENTION

Accordingly, the present invention relates to a formulation for the treatment of wood material having acceptable preservative ability and additionally at least partially obviating the problems of the prior art formulations.

As noted above, the formulation comprises an aqueous ammoniacal solvent having a wood treating composition dissolved therein. This composition will comprise a quaternary ammonium compound, and at least one of copper and zinc. The quaternary ammonium compounds contemplated for use in this composition can be represented by the general formula $(R_1R_2R_3R_4N^+)X^-$ where $R_1$ and $R_2$ are independently chosen from the group consisting of alkyl groups having 1 to 3 carbon atoms, $R_3$ is chosen from the group consisting of alkyl groups having 8 to 20 carbon atoms, and $R_4$ is chosen from the group consisting of alkyl groups having 8 to 20 carbon atoms, aryl groups and aryl substituted alkyl groups, where the alkyl groups have 1–3 carbon atoms. The anion $X^-$ will be chosen so as to solubilze the quaternary ammonium compound and will preferably be chosen from the group consisting of hydroxide, chloride, bromide, nitrate, bisulfate, acetate, bicarbonate and carbonate, formate, borate and fatty acid salts. Quaternary ammonium compounds preferred for use in this composition are alkylbenzyldimethylammonium chloride where the alkyl can represent $C_{12}$–$C_{16}$ alkyl groups, and dialkyldimethylammonium chloride, where the alkyl can represent $C_8$–$C_{12}$ alkyl groups. The aryl-substituted alkyl group will preferably be the benzyl group.

The formulation will be prepared by dissolving metallic copper and/or zinc in the aqueous ammonium hydroxide or by dissolving a suitable copper or zinc salt such as cuprous oxide, cupric hydroxide, zinc oxide or cupric carbonate in ammonium hydroxide containing a suitable amount of anion such as fluoride, acetate, carbonate, formate or borate which is added to dissolve the metal in adequate concentration. When metallic copper, zinc or cuprous oxide are used, an oxidation of the solution will be required. This can be done by sparging the solution with air; and in this case, the quaternary ammonium compound should be added after its termination in order to avoid excessive foaming. Quaternary ammonium compounds are usually supplied in the form of a concentrate, at about a 50–80% (by weight) concentration of the compound, and will normally be added as the undiluted concentrate.

Typically, in such compositions, the concentration of the metallic cation in the solution viz. that of copper and/or zinc will lie in the range of 0.5–15% of the formulation and the ammonia which will be present in sufficient quantity to solublize the metallic cations can range from 1–29% by weight of the solution. The ammonia concentration should be 1.5–2.5 times that of the metallic species expressed as the metal oxide.

Wood material can be treated with this composition in the usual manner (e.g. by soaking, impregnating, etc.). The composition impregnates wood material relatively easily and following impregnation is highly leach-resistant. Since the quaternary ammonium compound demonstrates an affinity for the wood material and is preferentially absorbed thereby, low concentrations may result in inadequate penetration and accordingly it may be necessary to use relatively high concentrations of the quaternary ammonium compound if deeper penetration is desired. The empty cell treatment, as defined for instance in Book of Standards published by the American Wood-Preservers Association cases in order to remove excess quaternary ammonium compound.

The composition can be modified in a number of ways which will be evident to those skilled in the art; e.g. fatty acids for water repellancy or coloring agents can be added to the composition.

The present invention provides an aqueous ammoniacal arsenic-free composition which finds application in wood preservation. Despite its low mammalian toxicity, the formulation has effective biocidal properties as demonstrated by the existence of threshold retention levels for various fungi which are surprisingly less than corresponding values for a conventional arsenic-containing formulation. The significant decrease in the aggregate threshold retention of the preservative, as compared to the threshold retention levels of the individual components when small amounts of quaternary ammonium compound are added to the ammoniacal copper containing solution strongly suggests the possibility of synergism between the two components.

The following examples will serve to illustrate the invention.

EXAMPLE 1

The formulation prepared according to the present invention containing copper added as copper carbonate, alkylbenzyldimethylammonium chloride dissolved in a 3% ammonium hydroxide solution, was impregnated into ¾"×¾"×¾" blocks of red pine sapwood material at various levels of preservative retention. The blocks were then subjected to leaching with water by soaking them in 50 ml. of water per block, and changing the water every day for 14 days. The blocks were air dried to constant weight in a chamber held at 70% R.H. The conditioned blocks were weighed and placed in soil block test jars containing innocula of "Lenzites trabea", "Poria monticola" and "Lentinus lepideus" fungi, in accordance with AWPA soil block test procedure M10-77. After 12 weeks, the soil blocks were reweighed, and the minimum level of preservative retention required to result in weight losses of less than 2% for each species of fungus was determined. These threshold rentention levels (in pounds per cubic foot), for various fungi are summarized in Table A below.

This experimental procedure was carried out with two alternative formulations of the present invention containing different ratios of copper to the quaternary ammonium compound. For the purposes of comparison, this procedure was repeated using a conventional aqueous ammoniacal solution of copper arsenate, and the corresponding threshold retention values obtained.

An examination of Table A will yield the observation that smaller threshold retentions of the present invention formulations are required to obtain the same level of protection when compared to the conventional formulation.

TABLE A

| | ORGANISM | THRESHOLD RETENTION LEVELS (pound per cubic foot) |
|---|---|---|
| CONVENTIONAL FORMULATION | | |
| Ammoniacal Copper Arsenate | *Lenzites trabea* | 0.09 |
| | *Portia monticola* | 0.14 |
| PRESENT INVENTION FORMULATION | | |
| CuO: Quaternary: 6:1 | *Lenzites trabea* | 0.07 |
| | *Portia monticola* | 0.09 |
| | *Lentinus lepideus* | 0.035 |
| CuO: Quaternary: 2:1 | *Lenzites trabea* | 0.07 |
| | *Poria monticola* | 0.19 |
| | *Lentinus lepideus* | 0.04 |

EXAMPLE 2

This example compares the preservative properties of the treating solution with the preservative properties of its constituent treating chemicals by comparing the respective threshold retention levels. Procedurally, the experiments in this example are essentially the same as those in the preceding examples. ¾"×¾"×¾" blocks of red pine sapwood material were impregnated with aqueous ammoniacal solutions of copper carbonate only, the quaternary ammonium compound ABDA only, and the preservative composition having a ratio of copper (as CuO) to quaternary ammonium compound of 4:1. Preservative solutions with copper to quaternary ammonium compound ratios of 6:1 and 2:1 were also impregnated into wood blocks. The blocks were then leached and dried, and placed in soil block test jars which contained innocula of "Lenzites trabea", "Poria monticola" and "Lentinus lepideus". This permitted a determination of the threshold retention levels which are summarized in Table B below.

An examination of the entries in the table below indicates the efficiency of the formulation taught herein. In each of the cases, the threshold retention concentration of the present invention formulation was at most equal to (and often less than) the corresponding values of the individual constituents. More particularly, in the case of "Poria monticola", which is tolerant to both copper (threshold retention of 0.5 p.c.f.) and ABDA (threshold rentention of 0.2–0.4 p.c.f.); the use of the present formulation results in a decrease in the retention levels of copper to 0.06–0.09 p.c.f. and ABDA to 0.02–0.10 p.c.f.; while the total threshold retention level lies in the range 0.09–0.19 p.c.f., (depending on the CuO:ABDA ratio) indicating an interaction between the two components.

TABLE B

| THRESHOLD RETENTIONS (Leached Blocks) | | | | |
|---|---|---|---|---|
| | | Threshold Retention (pcf CuO+ ABDA) | Concentration at Threshold Retention (pcf) | |
| Preservative | Organism | | CuO | ABDA |
| $CuCO_3$ | *Lenzites trabea* | 0.07 | 0.07 | — |
| | *Poria monticola* | 0.50 | 0.50 | — |
| (*)ABDA | *Lenzites trabeau* | 0.3 | — | 0.3 |
| | *Poria monticola* | 0.2–0.4 | — | 0.2–0.4 |
| | *Lentinus lepideus* | 0.07 | — | 0.07 |
| (+)ACQ 6:1 | *Lenzites trabeau* | 0.07 | 0.05 | 0.02 |
| | *Poria monticola* | 0.09 | 0.07 | 0.02 |
| | *Lentinus lepideus* | 0.035 | 0.025 | 0.010 |
| ACQ 4:1 | *Lenzites trabeau* | 0.06 | 0.04 | 0.02 |
| | *Poria monticola* | 0.10 | 0.06 | 0.04 |
| | *Lentinus lepideus* | 0.016 | 0.010 | 0.006 |
| ACQ 2:1 | *Lenzites trabeau* | 0.07 | 0.03 | 0.04 |
| | *Poria monticola* | 0.19 | 0.09 | 0.10 |
| | *Lentinus lepideus* | 0.04 | 0.02 | 0.02 |

(*)ABDA—alkylbenzyldimethylammonium chloride
(+)ACQ-composition of the present invention, ratio indicated is that of CuO to ABDA

EXAMPLE 3

This example demonstrates the desirable impregnation characteristics of the present invention. A 2"×2"×22" piece of Douglas fir sapwood was end-sealed with epoxy resin and impregnated with a solution containing 1.5% cupric oxide (added as basic copper carbonate), 0.5% alkylbenzyldimethylammonium chloride (ABDA), and 3.0% ammonium hydroxide by applying a vacuum of 22" of mercury for half an hour and then applying a pressure of 115 psi for 4½ hours at 22° C. The retention achieved (CuO+ABDA) was 0.58 p.c.f. After drying, a 2" section was cut from the center of each 22" piece and this 2" cube was then sectioned so that the retention gradient of the copper and ABDA could be determined. The results for the four faces of the cross-section were averaged and are shown in table C below, and indicate the desirable impregnation characteristics of the present invention.

TABLE C

| PENETRATION INTO DOUGLAS FIR SAPWOOD USING SOLUTION OF COPPER TO ABDA RATIO OF 2.4:1 | | |
|---|---|---|
| | CONCENTRATION IN WOOD (%) | |
| Location | Cu | ABDA* |
| 0–⅛" | 3.30 | 0.76 |
| ⅛–¼" | 2.22 | 0.43 |
| ¼–⅜" | 2.11 | 0.32 |
| ⅜–⅝" | 1.93 | 0.27 |
| ⅝–1" | 1.93 | 0.20 |

*ABDA: Alkylbenzyldimethylammonium chloride

EXAMPLE 4

This example presents the penetration results of the present composition into red pine sapwood. A piece of red pine sapwood was treated with a solution containing 1.5% copper oxide (added as copper carbonate), 2% of alkylbenzyldimethylammonium chloride (ABDA), and 3% of ammonium hydroxide using the same treatment and analytical procedure as the preceding example. A retention (CuO+ABDA) of 1.2 p.c.f. was obtained. The penetration results, which are shown in Table D below, indicate the desirable penetration characteristics of the treating solution.

TABLE D

| PENETRATION OF RED PINE SAPWOOD WITH A COPPER TO ABDA RATIO OF 0.6:1 | | |
|---|---|---|
| | CONCENTRATION IN WOOD (%) | |
| LOCATION | Cu | ABDA |
| 0"–⅛" | 3.66 | 2.76 |
| ⅛"–¼" | 1.54 | 2.13 |
| ¼"–½" | 1.44 | 1.52 |
| ½"–¾" | 1.45 | 1.37 |
| ¾"–1" | 1.75 | 1.74 |

Modifications to the above will be evident to those skilled in the art, without departing from the spirt of the invention as defined in the appended claims.

We claim:

1. A method of preserving wood which comprises impregnating a wood substrate with a wood preservative formulation comprising an aqueous ammoniacal solvent comprising ammonium hydroxide having a wood treating composition dissolved therein; where said composition contains a quaternary ammonium compound and a metallic cation consisting essentially of at least one of copper and zinc, where said quaternary ammonium compound can be represented by the general formula $(R_1R_2R_3R_4N^+)X^-$, where $R_1$ and $R_2$ are independently chosen from the group consisting of alkyl groups having 1 to 3 carbon atoms, $R_3$ is chosen from the group consisting of alkyl groups having 8 to 20 carbon atoms, and $R_4$ is chosen from the group consisting of alkyl groups having 8 to 20 carbon atoms, aryl groups and aryl-substituted alkyl groups where said substituted alkyl groups have 1–3 carbon atoms and $X^-$ is chosen so as to render said quaternary ammonium compound soluble in said ammoniacal solvent where said quaternary ammonium compound and said metallic cation are present in said formulation in biocidally effective amounts, and where the ratio of said quaternary ammonium compound to said metallic cation ranges from about 0.003 to about 30.

2. The method as defined in claim 1, wherein said aryl-substituted alkyl group comprises the benzyl group.

3. The method as defined in claim 1, wherein $X^-$ is chosen from the group comprising chloride, bromide, bisulfate, nitrate, acetate, carbonate and bicarbonate.

4. The method as defined in claim 1 wherein said metallic cation is present in a concentration ranging from about 0.5 to 15% of weight of said formulation.

5. The method as defined in claim 1 wherein concentration of said quaternary ammonium compound ranges from about 0.05 to 15% of said formulation.

6. The method as defined in claim 1, wherein the concentration of ammonia in said solvent lies in the range from about 1 to 28%, and is sufficient to dissolve said metallic cation.

7. The method as defined in claim 1 wherein said quaternary ammonium compound is one of alkylbenzyldimethylammonium chloride and dialkyldimethylammonium chloride.

8. The method as defined in claim 1 wherein said metallic cation is copper.

9. The method as defined in claim 1 wherein at least one anion chosen from the group consisting of fluoride, acetate, carbonate, formate and borate solubilizes said metallic cation.

10. A method as defined in claim 1 wherein said impregnating is by the full cell process.

11. A wood product as obtained by the method of claim 1.

* * * * *